Feb. 21, 1956 J. E. BARTLETTI 2,735,208
FISHING RODS
Filed April 19, 1951
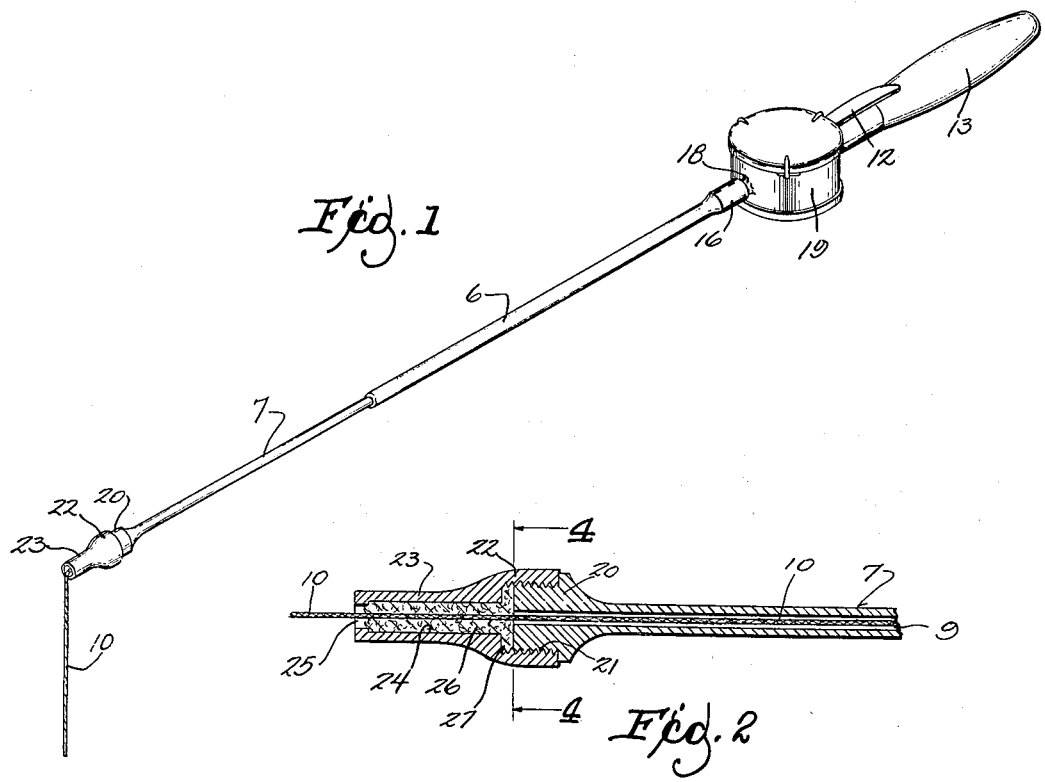
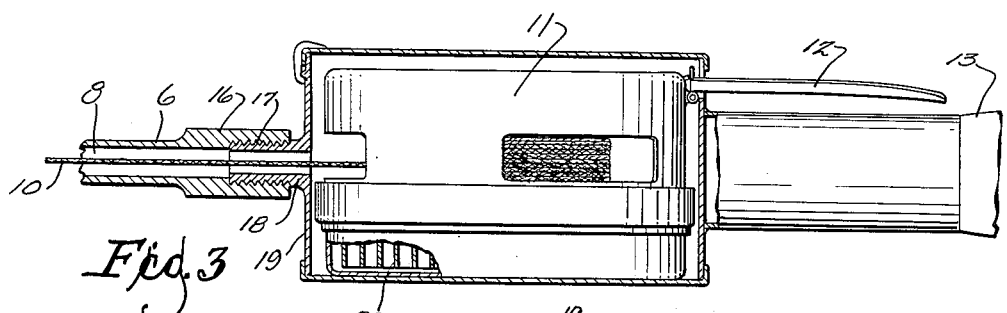
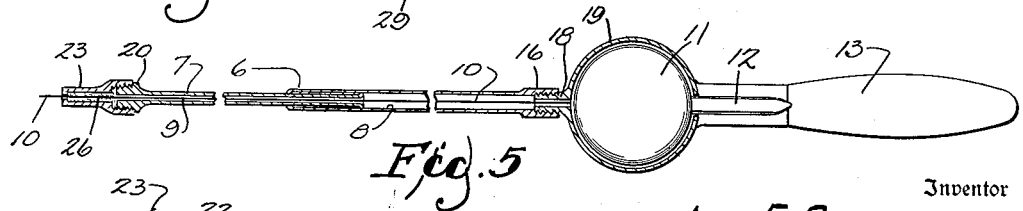
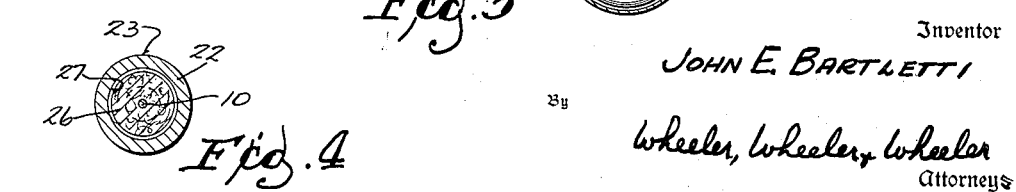
Inventor
JOHN E. BARTLETTI
By
Wheeler, Wheeler & Wheeler
Attorneys

United States Patent Office 2,735,208
Patented Feb. 21, 1956

2,735,208

FISHING RODS

John E. Bartletti, Antigo, Wis.

Application April 19, 1951, Serial No. 221,929

3 Claims. (Cl. 43—24)

This invention relates to improvements in fishing rods, and more particularly to a fishing rod adapted for ice fishing.

The invention consists in a tubular fishing rod having a wiping element disposed in the bore of the rod. In the preferred embodiment of the invention the wiping element is impregnated with an anti-freeze solution so as to treat the line with the solution as it is unreeled, and to again treat it as it is drawn back to the reel. When the fisherman is fishing in freezing weather, or is fishing through a hole in the ice, the anti-freeze solution will tend to prevent the line from becoming soaked with freezing water. When the line is reeled in, the wiping element functions also to wipe from the line any water adhering thereto, and thus insures that the wound line will be free of moisture which might freeze to interfere with the proper operation of the reel.

In the drawings:

Fig. 1 is a perspective view of a fishing rod embodying the present invention.

Fig. 2 is an enlarged fragmentary axial cross section taken through the tip of the tubular rod, wiper and wiper cap.

Fig. 3 is an enlarged fragmentary view in axial cross section taken through the enclosed reel portion of the rod, the reel being shown in elevation.

Fig. 4 is a cross sectional view of the cap and wiper taken on the line 4—4 of Fig. 2.

Fig. 5 is an axial cross section taken through an assembled fishing rod embodying the invention.

A fishing rod embodying the invention, and illustrated for purposes of exemplification only, comprises telescopic tubular rod sections 6 and 7 which, as best shown in Fig. 5, have internally aligned bores 8 and 9 through which is threaded a fishing line 10. The line 10 is wound upon a spring powered reel 11 having a trigger release 12 disposed adjacent the rod handle 13 as is conventional in this art.

As best shown in Fig. 3, the inner end of the rod section 6 is enlarged at 16 and is provided with internal threads 17 by means of which it is coupled to a threaded stud 18 on the housing 19 which contains the reel 11.

The end of the rod section 7 is provided with an enlarged end 20 having threads 21 upon which the threaded portion 22 of a cap 23 may be coupled. The cap 23 is provided with an internal cavity or passageway 24 which is aligned with the tubular bore 9 of the rod section 7. The cap is provided with an end opening or recess 25 which communicates with the cavity 24 and is also aligned with the bore 9 of rod section 7. The walls of the recess and the walls of the passageway are connected by a shoulder in a plane perpendicular to the passageway.

The cavity 24 provides a housing for a wiper or squeegee 26 which may be cotton or other absorbent material and which completely surrounds the line 10 when it is "laced" through the wiper 26 and tubular rod. The cavity also comprises an enlarged portion 27 containing a portion of the wiper 26 which may be compressed between the cap and rod tip to force the wiper against the line to insure uniform treatment of the line.

The wiping element 26 is desirably impregnated or soaked with an anti-freeze solution whereby the act of reeling the line 10 into the water through a hole in the ice will cause the line 10 to pass through the wiping element 26 to be coated, and to some extent impregnated, by the anti-freeze solution. Accordingly, the treated line will tend to repel such water as would normally soak the line. Upon reeling in the line, the wiper element 26 functions to wipe or squeeze from the line such water as does adhere thereto and to thereby exclude such water from the interior of the tubular rod and reel housing. Accordingly, the line wound upon the reel 11 will be to a great degree free from freezing water which would otherwise tend to freeze together the mutually adjacent coils of the wound line, and otherwise impair the operation of the reel and rod.

In the embodiment shown, the reel 11 is powered by a spring 29 so that the fisherman may merely actuate the trigger 12 to reel in the line and to simultaneously wipe it.

While the wiping element 26 may be optionally used only as a line wiper, its adaptation for use as an anti-freeze applicator increases the utility of the device. Rods equipped with the subject apparatus have been successfully used for ice fishing in the coldest weather without the line ever becoming frozen or unmanageable.

The arrangement disclosed, wherein the tubular cap 23 has a screw threaded connection to the rod tip, provides means for adjusting the compression of the wiper 26 on the line. By advancing or retracting the cap on the rod tip, the treatment of the line may be varied, and the drag of the wiper on the line may also be adjusted.

From the foregoing description, taken in connection with the accompanying drawings, it is seen that an improved fishing rod has been provided which wipes water from the line as the line is reeled in and which further may be adapted to treat the line with an anti-freeze solution as it is drawn from the reel and immersed in the water. The wiping element is disposed within a cap which constitutes an extension of the tubular rod and which completely houses the wiper and protects it from the elements. The wiper completely surrounds the line which passes through the rod so as to insure complete anti-freeze treatment and wiping action of the line.

I claim:

1. The combination with a tubular fishing rod having a bore, of a fishing line, an elongated cap for the tip end of the rod, the said tip end of the rod being externally threaded, the said cap being provided with an elongated passageway and a cylindrical recess continuous with the passageway and being of a larger diameter than the said passageway, the wall of the said recess being internally threaded to engage the external threads on the rod, and the said wall of the recess and those of the passageway being connected by a shoulder which is in a plane perpendicular to the passageway, the axes of the passageway, recess and the bore of the rod being in alignment and a fishing line threaded through the said aligned passageway, recess and bore, and a compressible pad so disposed in the passageway and recess as to surround the line, the compression of the pad against the line being varied by rotating the threaded cap on the rod whereby when the cap is advanced axially on the rod tip threads the pad will be compressed between the tip end of the rod and said shoulder to radially squeeze the pad against the line, the said pad being saturated with an anti-freeze solution so that the line, when reeled, may be both wiped and protected from freezing.

2. The combination with a tubular fishing rod having a bore leading to its end and a fishing line reciprocable in the bore, of a tip member and means adjustably coupling said tip member to the end of the rod, said tip member having an aperture substantially aligned with the bore and through which the line passes, the tip member and the rod end having complementary wall parts defining a cavity of materially greater cross section than the line and with which the bore and aperture communicate centrally and through which the line passes centrally between the rod bore and the tip member aperture, and compressible pad means in the cavity and disposed about the line in pressure wiping engagement therewith, said coupling means comprising means to advance the entire tip member and its wall toward the wall of the rod end to subject the pad in said cavity to axial compression between said walls to radially squeeze said pad against said line.

3. The device of claim 1 in which the pad is impregnated with an anti-freeze solution, a portion of which is transferred to the line as the line is wiped in passing therethrough.

References Cited in the file of this patent

UNITED STATES PATENTS

| | | |
|---|---|---|
| 645,137 | Schultz | Mar. 13, 1900 |
| 796,342 | Miller et al. | Aug. 1, 1905 |
| 1,173,827 | Marsh | Feb. 29, 1916 |
| 1,251,221 | Greenwald | Dec. 25, 1917 |
| 1,627,514 | Kramer | May 3, 1927 |
| 1,704,152 | Stevens et al. | Mar. 5, 1929 |
| 2,198,286 | Krivuta | Apr. 23, 1940 |
| 2,233,311 | Harne | Feb. 25, 1941 |
| 2,301,243 | Brinkley | Nov. 10, 1942 |
| 2,334,646 | Price | Nov. 16, 1943 |
| 2,402,882 | Garr | June 25, 1946 |
| 2,587,474 | Howard | Feb. 26, 1952 |

FOREIGN PATENTS

| | | |
|---|---|---|
| 10,745 | Great Britain | 1899 |
| 980,938 | France | Jan. 10, 1951 |